United States Patent
Choi et al.

(10) Patent No.: US 10,298,292 B2
(45) Date of Patent: May 21, 2019

(54) DIRECT CURRENT POWER LINE COMMUNICATION CONTROL DEVICE USING H-BRIDGE CIRCUIT

(71) Applicants: TinyPowers Co., Ltd., Anyang-si (KR); ChangJoon Choi, Anyang-si (KR); JaeBoo Choi, Anyang-si (KR)

(72) Inventors: ChangJoon Choi, Anyang-si (KR); JaeBoo Choi, Anyang-si (KR)

(73) Assignee: TINYPOWERS CO., LTD., Anyang-si (KR)

( * ) Notice: Subject to any disclaimer, the term of this patent is extended or adjusted under 35 U.S.C. 154(b) by 0 days.

(21) Appl. No.: 15/317,459

(22) PCT Filed: Jun. 17, 2015

(86) PCT No.: PCT/KR2015/006124
§ 371 (c)(1),
(2) Date: Dec. 9, 2016

(87) PCT Pub. No.: WO2016/003090
PCT Pub. Date: Jan. 7, 2016

(65) Prior Publication Data
US 2017/0111086 A1    Apr. 20, 2017

(30) Foreign Application Priority Data

Jun. 30, 2014 (KR) .......................... 10-2014-0080519
Jun. 16, 2015 (KR) .......................... 10-2015-0085004

(51) Int. Cl.
*H04B 3/54* (2006.01)
*H02J 13/00* (2006.01)
(Continued)

(52) U.S. Cl.
CPC ............... *H04B 3/54* (2013.01); *G08C 19/02* (2013.01); *H02J 13/0089* (2013.01); *H04B 3/548* (2013.01); *H05B 37/02* (2013.01)

(58) Field of Classification Search
CPC . H04B 3/54; H04B 3/56; H04B 3/548; G08C 19/02; H02J 13/0089; H05B 37/02
See application file for complete search history.

(56) References Cited

U.S. PATENT DOCUMENTS 5,630,836 A * 5/1997 Prem .................. A61N 1/37211
607/1
2006/0079971 A1 4/2006 Billo
(Continued)

FOREIGN PATENT DOCUMENTS

EP    2645587    *  3/2012  ............. H04B 3/548
GB    2517727    *  8/2013  ............... H04B 3/54
(Continued)

*Primary Examiner* — Sophia Vlahos
(74) *Attorney, Agent, or Firm* — Korus Patent, LLC; Seong Il Jeong (57) ABSTRACT

Polarities of voltages on a plurality of electric wires are reversed with an H-bridge circuit applied in accordance with control information or data to be transmitted, information or data transmitted as change of polarities is found on the reception side, and the transmitted power is restored to direct current power through a bridge diode circuit and is used as power supplied to a load. Each load has a unique ID input and storage means, and the present invention is a communication method in which the unique ID is designated to the transmitted information or IDs are designated to groups to control a load. In addition, it is a method for spreading a PWM operation time to minimize noise generated in accordance with PWM driving on the reception side. In a direct current transmission and reception environment, data or a command signal for power demand response is mapped with the polarity of voltage and is transmitted to each customer, (Continued)

and it may be applied to the power demand response technique.

1 Claim, 3 Drawing Sheets

(51) Int. Cl.
 *G08C 19/02* (2006.01)
 *H05B 37/02* (2006.01)

(56) References Cited

U.S. PATENT DOCUMENTS

| | | | |
|---|---|---|---|
| 2009/0195192 A1* | 8/2009 | Joseph | H04B 3/54 315/307 |
| 2009/0273334 A1* | 11/2009 | Holovacs | G06F 1/26 324/66 |
| 2010/0332101 A1* | 12/2010 | Braunberger | B60Q 1/447 701/96 |
| 2012/0195385 A1* | 8/2012 | Puchianu | H04B 3/548 375/257 |

FOREIGN PATENT DOCUMENTS

| | | |
|---|---|---|
| JP | 2005-269553 A | 9/2005 |
| JP | 2014-003600 A | 1/2014 |
| JP | 2014-032813 A | 2/2014 |
| KR | 10-2002-0060408 A | 7/2002 |
| KR | 20-0388976 Y1 | 7/2005 |
| KR | 10-2005-0082021 A | 8/2005 |
| KR | 10-0896808 B1 | 5/2009 |
| KR | 10-1043218 B1 | 6/2011 |
| KR | 10-1222170 B1 | 1/2013 |
| KR | 10-2013-0030725 A | 3/2013 |

* cited by examiner

DIRECT CURRENT POWER LINE COMMUNICATION CONTROL DEVICE USING H-BRIDGE CIRCUIT

TECHNICAL FIELD

The present invention relates to a method for transmitting power of a direct current power source and simultaneously transmitting data or control information through one line. In a case of an LED lighting field, which is one of the embodiments of the present invention, the final power use type is direct current power, so the direct current power and control information are transmitted through the same line by using the existing installed line for lighting as it is, making it possible to transmit the control information for adjusting brightness or color of each LED lighting lamp connected to a lighting line, and to control each LED in accordance with reception control information in various reception side LED lighting lamps connected in parallel.

When a battery is used basically, such as in vehicles, each load in a vehicle uses direct current power, and it is useful even for a case of transmitting power and control information to each load. The present invention relates to power line communication of transmitting direct current in which mutual communication or multilateral communication can be embodied by one line while supplying sufficient direct current power capable of driving a motor or the like in a sensor or a driving device installed at a remote place.

Currently, it is general to transmit alternating current power to each customer in a power system network, but recently, studies about high-voltage direct current (HVDC) transmission and distribution have been proceeding. In a demand response technique or the like, when a risk of blackout is detected because of a low rate of current power reserve, it is necessary to transmit a command or data for demand adjustment of loads to each customer. When direct current is transmitted to a customer, a load adjustment command of a customer or a risk rating data value about the inconsistency of current power demand and supply may be transmitted in batches with direct current power on a power line to each customer.

BACKGROUND ART

A power line communication (PLC) technique of transmitting and receiving power and information through a power line has been commercialized, and the referred and compared conventional technique is as follows.

Known Power Line Communication Technique

In a case of power line communication which is the widely known technique, generally a signal to be transmitted to a high-frequency RF signal or a short-width impulse signal is modulated and applied to a power line in various methods, and the receiving side utilizes a filter technique of separating only a signal of the corresponding frequency transmitted through the power line or a demodulation technique of restoring a signal from a synchronization circuit or the like, and recently developed various digital communication techniques are engrafted to cope with disturbance and to minimize occurrence of error, and techniques of restoring error when error occurs are also engrafted.

However, high costs occur because various engrafted techniques are relatively complicated, it is vulnerable to noise because it uses weak signals, and there is an inconvenience to install a blocking filter or the like at the inlet stage to block the signals from being transmitted to an undesired portion through the power line.

The facts that economical communication based on a universally used general microcontroller is difficult, and that there is a problem in cost since a modem chip dedicated for communication has to be separately mounted are the main disadvantages. If economic burden is rather larger than the case of separately installing a power line and a communication line, the value as a practical technique is low, and an alternative power line communication method which can be embodied with small and inexpensive components is necessary.

The term of power line communication mentioned hereinafter is not the concept of information being carried and transmitted to a high-frequency area which general persons skilled in the art know, but will be used as a concept wider than the term in common use with the meaning of communication of transmitting power and information together by using a power line.

Korean Patent No. 10-1222170 "LIGHTING DEVICE AND LIGHTING SYSTEM INCLUDING THE SAME"

This is a method of transmitting information to each lighting load by reflecting to a basic frequency waveform of alternating current electricity in a type of phase information at the time point of trigger to turn on by using a classical Triac phase control method, and it is possible to transmit information by using the existing installed power line as it is. It is a patent capable of independently controlling each LED lighting lamp by assigning an individual ID to an LED lighting lamp, but has the following disadvantages.

Since AC power is used, a time of a section in which power is not actually transmitted in accordance with a time point of zero crossing circumference or a time point when a phase control signal is generated is long. Since the waveform of a basic frequency has low frequency, if it does not pass through a process of smoothing power by applying an electrolytic capacitor with high capacity, flicker of LED lighting severely occurs. A volume of each LED lighting device or a lighting power supply device gets larger in accordance with the application of an electrolytic capacitor to reduce the flicker. In the case of long time use, which is identified as a main cause of the breakdown of an electrical product, it is difficult to avoid the problem of reducing the lifespan by deterioration according to disappearance of electrolyte in the electrolytic capacitor.

Particularly, since each LED lighting lamp or a power supply device for the lighting lamp installed on the ceiling is provided with an electrolytic capacitor component with high capacity which is a main cause of reduction of lifespan, the lifespan is short and maintenance is difficult. Since a transformer or an inductor is used for converting alternating current power into low voltage actually used in an LED element, the volume becomes significantly large which makes it inconvenient to construct and manage.

Korean Patent No. 10-1043218 "RS 485 COMMUNICATION DEVICE USING TWO-WIRE POWER LINE"

Voltage levels of two-wire power line are made different as high and low in accordance with transmission and reception data, and the levels are transmitted as transmission and reception information. Seeing the amount of power transmission, it is difficult to maintain low impedance of an ideal constant voltage source, so it is not suitable for the use of transmitting high power capable of driving a high-capacity load.

If maintaining low impedance is intended to transmit higher power, the level of the signal becomes relatively low, so the noise margin is reduced, and a communication more stable than differential signal communication employed in the present invention becomes difficult.

Since the voltage fluctuation according to transmission of a signal is severe, a capacitor with high capacity is necessary, and attention is required because it does not operate if connection of polarities is different at the time of installing a line. In a case of direct current power transmission, a disadvantage of attention being required at the time of installation since it is necessary to distinguish polarities of + and −, and there is a practical problem that a situation in which mutual recognition is not achieved due to reverse phase even in a case of communication information may occur.

A power demand response technique is receiving attention, in which blackout is prevented and a highly maintained power reserve rate is maintained low to reduce a generation fuel ratio at normal time. In a case of Korean Laid-Open Patent "POWER DEMAND AND SUPPLY DISASTER PREVENTION SYSTEM" Application No. 10-2012-0100238, Publication No. 10-2013-0030725, a risk state where a current power reserve rate goes to 0% is graded, and the risk grade value is carried on a fluctuation pattern of a physical value of a basic frequency waveform of electricity, for example, voltage, frequency, and phase, and is transmitted to each customer who decodes it to adjust a load or to adjust a control target value controlled by the load.

In the future, when an extra high voltage direct current transmission and distribution technique is commercialized, direct current power may be supplied to a customer, and in a case of an island or a remote place, attempts to make local transmission and distribution system with direct current are being made. In this case, the power supply and control and the data transmission methods based on direct current of the present patent can be engrafted to the power demand response technique of adjusting a customer load.

SUMMARY OF INVENTION

Technical Problem

The present invention is to embody advanced power line communication which overcomes the problems or the disadvantages of the conventional technique mentioned in the background techniques of the invention. In addition, it is necessary to resolve the problem in the conventional technique, that when a plurality of reception loads are simultaneously connected to one power line and the power of a load element is controlled by a pulse width modulation (PWM) manner on each reception load side and when each turn-on time is overlapped for each load connected to one power line and configured in parallel, large current simultaneously flows and large power noise occurs, which makes the capacity of a capacitor for smoothing or a filter of a power supply unit to increase.

The capacitor has a problem of a cost of an element itself, but also is a main cause of breakdown, is directly related to the lifespan, occupies volume, and construction of an object with a large volume on a ceiling or at a place where installation is not convenient causes inconvenience of construction and management and causes a problem disadvantageous in view, and thus improvement related to a capacitor has a big advantage.

When a power reserve rate becomes low and there is a risk of blackout, the power authority transmits a control signal for adjusting a load of a customer or transmits data to which a current demand and supply risk degree for adjusting a self-power demand in a customer is reflected, which are important elements of the power demand response technique.

Currently, transmission and distribution of alternating current power are general, but in the future, if the system is changed to direct current transmission and distribution or in a case of a micro-grid constituting one small independent electrical system network in an island or at a remote place, environment of transmitting power with direct current in each customer can be constructed. In this case, an economical method of transmitting, to each customer, a demand adjustment command for performing a power demand response or a comparison reference value to which a power demand and supply risk degree of a power system network for self-load adjustment of an electrical device and a load of a customer is embodied.

Solution to Problem

When power of (+) is applied to a line A and the ground or power of (−) is applied to a line B on two lines A and B connecting transmission and reception sides for power line communication, a digital value is mapped with "1", and when the reverse power is applied, the digital value is mapped with "0". Power is connected to two power lines A and B in accordance with information to be transmitted, and an operation of changing power polarities to each other in accordance with the flow of time (hereinafter, referred to as alternating, polarity conversion or change of polarities) is performed, then the power reception side figures out what power applied to the power lines A and B is, and it is interpreted with the digital values "0" and "1", and can be used as reception data or a control command signal.

When the polarity of the voltage applied to the power lines A and B is changed in accordance with the flow of time, an aspect of polarity conversion may be represented in various patterns according to the flow of time. Accordingly, the digital value "0" may be mapped with one polarity and the digital value "1" may be mapped with the other polarity, but the digital value "0" is mapped with a specific pattern of polarity state change and the digital value "1" is mapped with the other pattern by commitment to each other in advance, and power is transmitted by changing the polarity in accordance with time, and the digital values "0" and "1" may be decoded in accordance with the commitment on the reception side to communicate.

On the transmission side, the polarity conversion mobilizes an optimal method capable of transmitting high power with low impedance by using metal-oxide-semiconductor field effect transistors (MOSFETs) H-bridge circuit. This is similar to a general signal communication manner but is characterized in applying the MOSFET H-bridge circuit to the power transmission with low impedance.

On the reception side, smooth direct current power is made from the power signal with continuous polarity conversion through a bridge diode. This power is used as a power source in loads on the reception side, and is used as power necessary for the control terminal on the reception side. The bridge circuit on the reception side is not limited to the bridge diode, and an active bridge circuit including metal-oxide-semiconductor field effect transistors (MOSFETs) or insulated gate bipolar transistors (IGBTs) may be used.

A circuit is provided for a situation when the connection of the transmission and reception sides is failed and the information of the reverse state of what to be transmitted is transmitted, the circuit detects the information from a signal and automatically reverses the information.

As described above, when the transmission information is transmitted by differential signal communication, it is easy to distinguish "1" and "0" of signals, resistance to common mode noise is strong, so it is possible to perform stable communication even at a long distance.

When transmission is desired even on the power reception side at a predetermined time to maintain high impedance on the transmission side and the other reception side in order to make two-way communication possible, and if a method for transmitting information by operating a provided differential driving circuit is employed, restrictive two-way communication is possible. As described above, through the method of changing a phase of direct current power without passing through modulation and demodulation for signal transmission, it is possible to embody a communication method which minimizes the circuit, raises the reliability of communication, and is economical.

The power demand response requires a technique of transmitting a signal of load adjustment or information for load adjustment to each customer in batches by reflecting a risk degree of power demand and supply with reference to the current power reserve rate. When direct current transmission and distribution are constructed, 'power demand and supply risk graded value' obtained by grading a risk degree of power supply and demand is carried as data on a polarity change pattern made by the H-bridge circuit and transmitted to each customer, and each customer can adjust demand with reference to the data.

Advantageous Effects of Invention

When the existing electric wire is installed in a building such as an ancient building, a means for easily controlling each of power loads connected to the electric wire by using the connection of the existing electric wire may be provided.

For example, in a case of an indoor lighting, a power control transmission unit replacing the existing circuit is positioned around a switch box embedded in the existing wall, so it is possible to control brightness at the position of each lighting lamp provided on the ceiling, or an LED lamp provided therein with a reception circuit of a direct current power line communication control device of the invention is mounted, and thus installation is easy.

In a case of an LED lighting which is a mainly applied load, it can transmit DC polarity conversion power to an LED module using two power lines output from a switch terminal, and it is possible to transmit control information simultaneously, it can distinguish a unique ID of each LED module or an LED power supply device, the ID is transmitted to the control information to control only a specific LED lighting lamp, it can interpret MSB bit values of the ID as a group value to perform group control, it can assign a separate ID to a series of predetermined load groups to selectively control only a specific load, or when a broadcasting ID is assigned to the ID or a broadcasting command is provided, it is possible to uniformly control the entire loads. As described above, there is an advantage capable of controlling loads by various numbers of cases, and this is not limited to the LED lighting lamp and can be applied to various loads.

As compared with the existing known technique of a wired communication method, an RF control module (ZigBee or ISM Band RF communication, etc.), or a power line modem (PLC) performing power line communication of transmitting information by using a high frequency band, the present invention has simple constituent elements and is economical. In addition, communication with reliability is possible with respect to disturbance noise, and there is an advantage that a lot of unnecessary RF electric waves are not generated.

The invention will be compared with Prior Art Document, Korean Patent No. 10-1222170 "DIMMING DEVICE AND LIGHTING SYSTEM INCLUDING THE SAME" which is Prior Art as the background of the invention.

When alternating current power is used as a means of power line communication, each LED lighting or a control terminal before the LED lighting ultimately uses direct current power and goes through a process of converting alternating current into direct current, it is essential to mount an electrolytic capacitor which is a main breakdown cause of shortening a lifespan for each terminal load. In case of the lighting, since it is mounted on a ceiling or the like where installation and management are not easy. Accordingly, when maintenance is frequent due to a problem of a frequently broken electrolytic capacitor, high cost and long time are required in maintenance according to inconvenience of the mounting position. In addition, various protective circuits and a transformer mounted together with an electrolytic capacitor require a relatively large capacity volume, and they are restrictive elements in aesthetic design in installation on a ceiling or the like which receives the attention of people.

In the present invention, a direct current power line communication is used, thus an electrolytic capacitor, a transformer, and a protective circuit are required to convert alternating current power into direct current power. However, they are not individually installed on the ceiling or the like where installation is difficult, the volume of the lighting device is much reduced, so it is possible to perform aesthetic design, and the frequency to directly replace a lighting lamp on the ceiling or to replace a lighting power supply unit is very low due to a problem of the electrolytic capacitor, and thus there is an economical advantage of maintenance.

When a plurality of capacitors are modularized and mounted at a place where capacitors for direct current can be easily managed separately and installed to be direct current at that place, there is an advantage of management in a type of managing a centralized capacitor box without individually managing the equipment of the ceiling due to a problem of lifespan of the electrolytic capacitor. In addition, the capacitors in such a capacitor box can be manufactured in a shape that can be replaced to a modular type, and the management can be more convenient when a function of reporting a module to be replaced through an LED lamp or the other display means at the time of breakdown of a capacitor is added.

In the present invention, two-way communication is partially possible similarly to RS-485 communication, and collecting sensing information is also possible through a sensor which has to load information on one power line connected together with a power driving circuit. This is an effect which cannot be embodied by Prior Art Document, Korean Patent No. 10-1222170 "DIMMING DEVICE AND LIGHTING SYSTEM INCLUDING THE SAME" which is the Prior Art of an alternating current manner.

An effect more excellent than Prior Art Document, Korean Patent No. 10-1043218 "RS 485 COMMUNICATION DEVICE USING TWO-WIRE POWER LINE" will be described.

In Cited Invention, a two-wire power line is used, but voltage of a pulse type of voltage falling and rising is applied to one electric wire to transmit a signal. As disadvantages thereof, it is difficult to maintain low impedance of an ideal constant voltage source to easily generate a pulse as described above, so the amount of power which can be transmitted is very restrictive, and it is not suitable for the usage of transmitting high power capable of driving a high-capacity load.

As impedance gets lower to transmit high power for driving a high-capacity load, a waveform of a signal pulse gets lower, finally it is difficult to distinguish a signal from a noise, thus stable communication is difficult. In addition, since it is not a high-power pulse signal, when a load using received power mixed with a pulse signal is adjusted through PWM control, a waveform and a level of the generated noise are similar to those of a pulse for communication, and that influences as a noise.

On the contrary, in the present invention, two lines are distinguished as power of (+) and (−), signals are differentially carried on power and are transmitted by using an H-bridge circuit employing a MOSFET with extremely low on-resistance, and thus the problem of small amount of power which can be transmitted in Cited Invention is solved.

Compared with a classical power line communication manner and a square wave direct current power line communication of carrying and transmitting data on a square wave pulse to predetermined direct current bias voltage, a width of a signal is very large, and there is an advantage that an S/N ratio (signal-to-noise ratio) is very excellent.

The main point of power demand response technique is to transmit an intention of batch demand adjustment to each customer. In an alternating current environment, there is an idea of carrying it on an alternating current basic frequency waveform and transmitting it, and classical power line communication, an Ethernet device, or a wired communication manner is considered. In case of direct current transmission and reception environment, a high-frequency signal may be carried on direct current power and transmitted, but control or data for power demand response is mapped with polarity change of direct current voltage and is transmitted. When it is decoded and used, an advantage for cost and noise is excellent.

DESCRIPTION OF EMBODIMENTS

Figure 1:
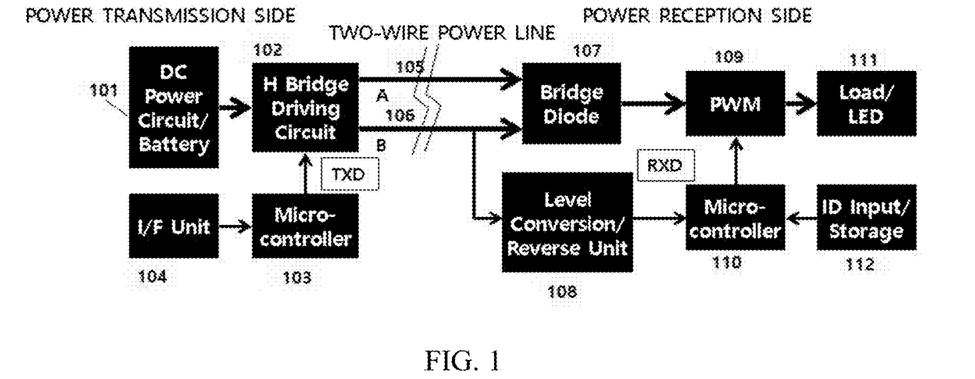
FIG. 1 is a block diagram illustrating constituent elements necessary for transmitting power and control information to the reception side and restoring the power and control information on the reception side.
Figure 2:
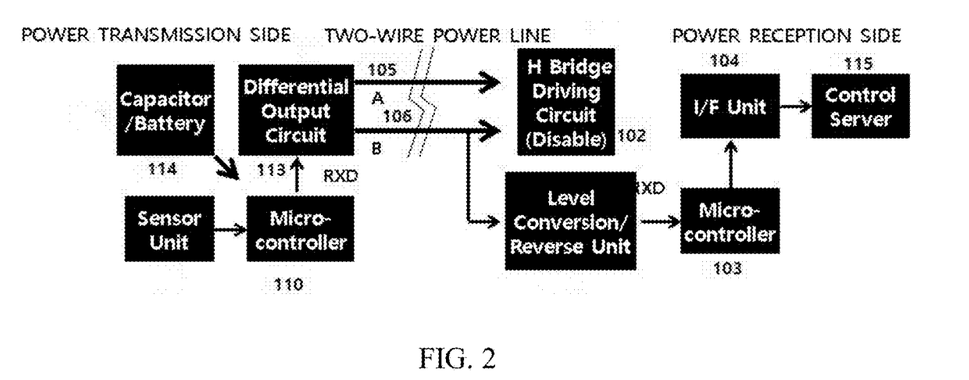
FIG. 2 is a block diagram illustrating constituent elements necessary for transmitting information from the power reception side to the power transmission side for two-way communication.
Figure 3:
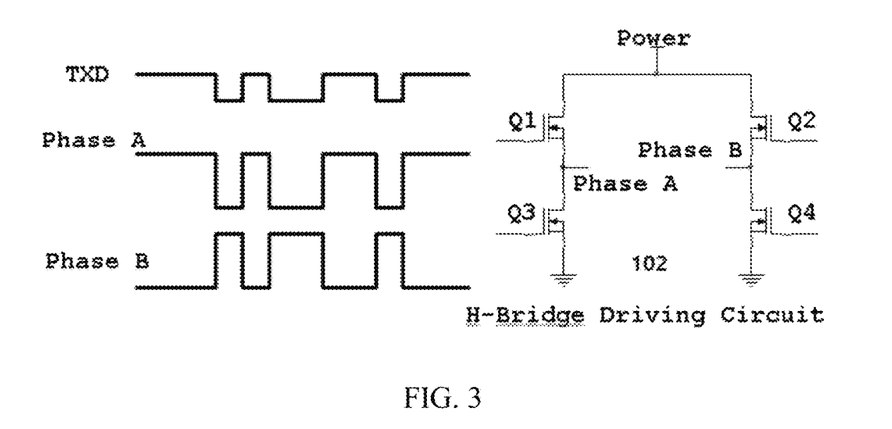
FIG. 3 is a diagram illustrating an H-bridge driving circuit and shapes of differential power output forms A and B to which a transmitted TX signal is changed through an H-bridge circuit.

Referring to FIGS. 1-3, a plurality of loads are connected to an output of a direct current power supply device which is a direct current power supply source or an output terminal of a battery 101 through electric wires in parallel, a transistor, a MOSFET, or an IGBT is provided at the output terminal of the battery 101 or the direct current power supply device, and an H-bridge driving circuit 102 capable of alternating polarities of (+) and (−) of the direct current power source output is connected. Change of relative values of magnitude of voltage of two power lines is referred to "polarity change" or "polarity fluctuation". The H-bridge driving circuit 102 changes polarities in accordance with data or information of a control command to be transmitted to by a microcontroller 103 or an external signal source, or outputs power of a change pattern of polarities according to time as mapped with digital values "0" and "1" in accordance with commitment in advance. In this case, it is driven to minimize cross over distortion.

Figure 4:
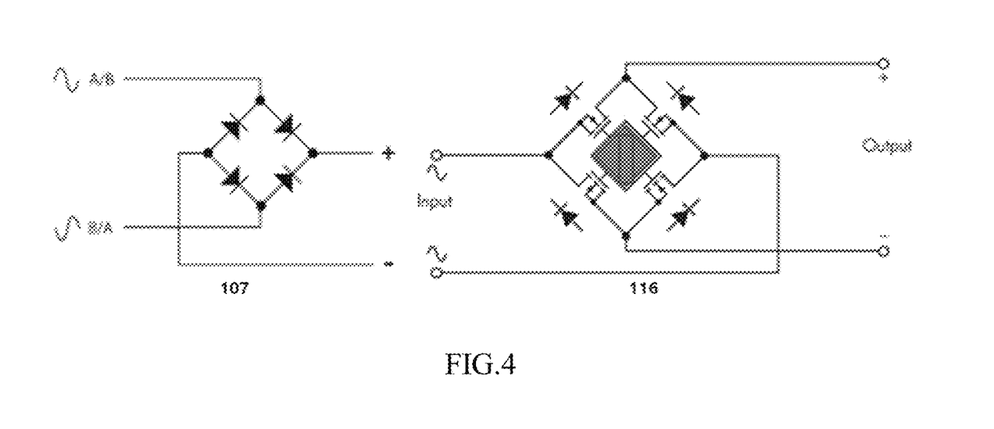
FIG. 4 is a diagram illustrating a bridge rectification circuit using a general bridge diode and a MOSFET which has low impedance and low power consumption and can control an operation.

Referring to FIG. 1 and FIG. 4, the reception side receives transmission side power in which polarity change event is performed routinely, and makes it into smooth direct current by using a bridge diode circuit 107 to use the power as direct current power. In order to obtain high efficiency, it is preferable to use a bridge diode circuit 107 with low forward bias. It is also one method to apply a bridge rectifier 116 based on metal-oxide-semiconductor field effect transistors (MOSFETs) and insulated gate bipolar transistors (IGBTs) to which a component having sufficient current capacity and reverse breakdown voltage is applied, and recently, in which on-resistance is extremely lower than that of a general bridge diode and power efficiency is high.

Figure 5:
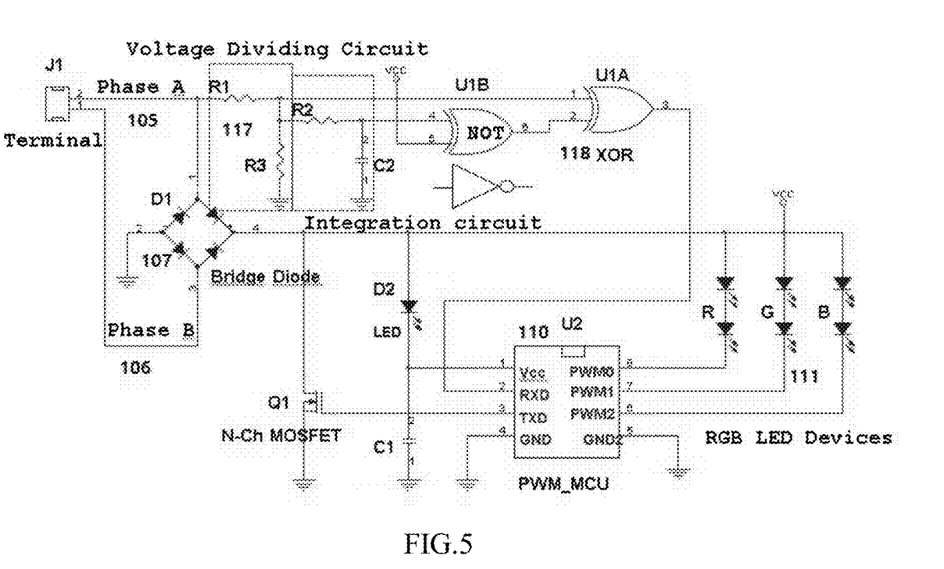
FIG. 5 is a diagram illustrating an example of a reception side circuit having an LED load including an automatic inversion circuit of control information according to reverse imaging by H/W and driving three kinds of RGB LEDs by PWM.

Referring FIG. 5, although a momentary voltage drop phenomenon according to polarity change occurs at the signal output end of the bridge rectifier circuit 107, it is not necessary to perform smoothing by using a capacitor for a short time, but it is preferable to locally use it for stable operations of circuits using this power.

A level shift unit 108 of a resistor voltage divider circuit 117 or the like for changing power voltage to signal voltage with a proper level may be necessary to extract communication data or a control command signal applied to a power line of the signal input end of the bridge diode circuit 107 on each load reception side.

Referring to FIG. 1 and FIG. 5, when the electric wires A 105 and B 106 are reversely installed on the reception side connected in parallel, the information is recognized as reversed information. Accordingly, when reveres connection is recognized by using voltage levels of electric wires in a default state, it is convenient to add a function of reversing serial signals transmitted by using a gate element such as exclusive OR 118 as necessary. In order to determine whether signals are reversed, an RC integration circuit which accumulates and outputs information of most time (default state) ordinarily with no signal is effective. More simply, input is performed to a port of microcontroller 110 or a dedicated logic circuit, and it is possible to determine reversed connection by easily accumulating basic phase information in a case of no signal by executing a program.

If necessary, periodically repeated polarity conversion information is transmitted, and each load shares a reference time of the transmission side, and uses a spread function of loads which may alternately use power which is a limited resource in order of corresponding to each ID. In this case, there are advantages that it is possible to supply a plurality of reception side demand power by the transmission side power with a small maximum value, it is possible to reduce noise occurring in accordance with power transmission of excess demand, and it is possible to reduce filter components such as a capacitor and an inductor for smoothing.

In this case, it is necessary to operate in order promised among loads operated by pulse width modulation (PWM) to each other, and they need to have reference time information coinciding with each other. Accordingly, the power transmission side sends a synchronization signal for allowing reference times of the reception sides to coincide for each predetermined period, and on the reception side, PWM driving is performed at a determined time with reference to the reference time, control information, and ID, to disperse the entire power. Even when a plurality of PWM driving loads are provided in one reception side, the PWM driving times are dispersed to each other in the same manner, the maximum required power is reduced at a short moment, and it is possible to minimize the entire occurring noise.

The content of transmitted information may be determined in advance by protocol to have specific meaning, and thus various information processing methods are possible. By using IDs or commands corresponding to broadcasting capable of simultaneously controlling all of the connected power control devices, the entire may be controlled or data may be transmitted to the entire. And by using an ID classified for each control device, individual devices may be controlled or data may be transmitted to the individual devices. By a group ID for additional classification, a group may be controlled or data may be transmitted to each group.

The transmission side transmitting a control signal of a power load 111 may be a simple entire on/off switch to a dimmer adjustment input device. The content of control may be transmitted via interface Unit(I/F Unit) 104 from a remote control server 115, or may be transmitted by information transmitted from the outside through a power line modem or the other power line for power demand management or demand response, information transmitted by a wired signal such as RS-232, RS-485, or controller area network (CAN), or a wired signal capable of large capacity transmission such as local area network (LAN) communication. In addition, it may be transmitted by an ISM band RF communication signal such as ZigBee, Bluetooth, or Wi-Fi, and various formats of control information such as a wireless manner using the existing TV frequency idle band are received, and then may be retransmitted to a load.

In this case, a short-term information storage space for preventing data loss occurring by a problem of receiving a lot of data for a short time and transmitting the data through a power line for a relatively long time through a power line is necessary. When types of power control information data to be transmitted are much different, a code conversion unit which converts it into a desired type is necessary.

In controlling each connected power load in accordance with an information signal input from the outside, priority is given to a forced control signal based on a rotation input means such as a switch of itself or a volume or a wheel switch to be preferentially controlled. In this case, reversely, current control state information may be loaded through an input information path of the outside, and additional information such as power consumption information, power factor information, or breakdown diagnosis information based on capacity and a control value of each power control load may be loaded to a master side of a server or communication controlling the entire.

When there is no upper server device having an active function, it is possible to also serve as a server function having an input means connected to the interface Unit (I/F Unit) 104 such as a control switch, a wheel switch, and a touch panel, and a user interface means capable of displaying a state through an LED, an OLED, and an LCD display at the power control transmission terminal, and it is also possible to embody a structure of receiving a sensed current value of a value controlled by temperature, humidity, or illuminance, human sensor, or the other electronic devices and performing a negative feedback automatic control in a limited space with reference to the value.

In the case of each reception side control unit described above, it is possible to input or change a unique ID, and the control unit has to store the ID. Depending on personality, since it should be possible to assign a group ID, there may be an input means such as a switch.

Preferably, in a case of a control unit of the reception side load terminal, it is effective to connect an ID input device communicating by wire or wireless through a connector to avoid rising of costs of a product by adding components due to the ID input means 112. For example, a Bluetooth connector is provided on the outside, a Bluetooth module is attached thereto, and an ID value of a related device can be read and changed by wireless by an application program of a smartphone capable of Bluetooth communication.

On the reception side such as an LED lighting lamp 111 or a power supply device, power is converted into fixed direct current voltage with a constant value through a bridge diode circuit 107 similarly to an AC manner, but the transmitted power is direct current power, thus a function of smoothing by an electrolytic capacitor is not necessary, and a capacitor such as a small-capacity multi-layer ceramic capacitor (MLCC) should be mounted.

In order to make a direct current power source, a direct current power supply device or a power battery 101 is provided with a plurality of electrolytic capacitors with high capacity, and when the electrolytic capacitor is abnormal, removal and replacement as a module is made easy, and the direct current power supply device is placed at a place with easy management or is separated as a part of the direct current power supply device to be managed in an electrolytic capacitor box, thereby being convenient in management. This is the main cause of breakdown. When a circuit capable of detecting breakdown of the electrolytic capacitor is provided and the face thereof is displayed by an LED or the other display means, there is an advantage in management.

Mainly, even in a case of use for control, two-way communication is essential in order to load state information such as normal operation or not, and a process for simultaneously performing power transmission and two-way communication is necessary as in the present invention.

Only one transmission side has to exist on one communication line, so it is divided into a power transmission side master and a power reception side slave like communication protocol such as RS-485, and a signal has to output a signal to a commonly used line in accordance with the order promised in advance.

In order to transmit a signal, the H-bridge circuit 102 is used on the power transmission side, but a general differential output circuit 113 which can be driven with low power and is capable of output control is used on the power reception side, and differential output is performed only at the determined sequence capable of communication. In this case, the line on the power transmission side and the other power reception side is allowed to maintain high impedance.

At the time of transmitting a signal on the power reception side during two-way communication, the power reception side does not receive power from the power transmission side. Accordingly, at this time, a capacitor or a battery 114 with low capacity is provided to store power to be used on the power reception side. In a case of a circuit charging and using power with a capacitor, when a signal is transmitted on the power reception side, temporal disconnection between a line and a capacitor is necessary, and thus it is necessary to disconnect at the time of transmitting a signal on the power reception side by providing a switching means. On the power transmission side, it is possible to know the information transmitted on the power reception side with reference to voltage comparison outputs between two lines by using a comparator or the like, and it is possible to perform two-way communication in such a manner albeit partially.

As a specific embodiment of the invention, there are many cases of connecting and using the power transmission side mainly to the output of the direct current power supply device. Accordingly, it is convenient in a case of integration with the direct current power supply device, and a module or adapter type connected to the rear end of the direct current power supply device is preferable.

Meanwhile, the power reception side is positioned between a line and a load device, and thus may be a module connected therebetween, a socket, an adapter, or an integration type with a load. Particularly, when the power reception side is made into one integrated circuit by integrating a portion which can be an IC such as a PWM driving circuit 109, it is economical and it is possible to embody high reliability and a small volume.

Currently, a high voltage direct current (HVDC) distribution technique is being studied, an independent small electrical system network is configured in a case of an island and a remote place, and a micro-grid technique for the network is also being studied. This is referred to as a direct current transmission and distribution environment. Further widening the range from utilizing the technique as a means for load adjustment in a customer, an electrical system unit can be utilized.

In the direct current transmission and distribution environment, a power company, a power exchange, or a power authority managing a local power system network grades the predicted risk of blackout according to the inconsistency of power demand and supply with reference to the current power reserve rate to make data, which is mapped with the change of polarities of direct current transmission and distribution lines and is transmitted to each customer, and each customer decodes the data and adjusts a customer load in a manner promised in advance, for example, blocking a load with low importance in accordance with a risk grade or adjusting a control target value of the load, thereby performing power demand response.

Direct load blocking and adjustment commands are mapped with polarity conversion of direct current power as well as a risk grade value, and may be transmitted to each customer, and a demand response system which manages a load of a customer as promised in advance in response to the command may be configured. In this case, the target of identification ID of data or control command is the entire.

INDUSTRIAL APPLICABILITY

All of an energy storage system (ESS), solar power generation, and wind power generation which are key factors in a smart grid are based on a customer power system based on direct current. Alternating current is converted into direct current to be stored in a storage battery ESS, and since the output of solar light is direct current power and wind of wind power is not uniform, their power has to be converted into direct current and stored for use. As being called as the second Tesla-Edison Controversy, new understanding for direct current transmission and distribution is coming, and at the time point when ideas for high voltage direct current (HVDC), home direct current electric wiring, and spread of direct current electrical devices are provided and diffused, the spread of a technique of a lighting system having an advantage of direct current wiring while utilizing the existing alternating current wires as they are has a big meaning.

In the future, when the ESS spread is diffused and the development of solar power or wind power is diffused, a system environment of using the existing alternating current power line as it is and a lighting is controlled to be driven by utilizing direct current power at the time of storing and utilizing it as direct current will become necessary. Power loads of a customer are classified into loads for lighting and loads for electrical devices. In a customer direct current distribution system which is being studied, the spread of direct current devices requires a time due to a problem of standardization in case of including loads for electrical devices, and thus the present technique can contribute thereto as a means which can preferentially applied only to the wiring for lighting separated preferentially.

A smart grid technique, a demand response technique, a building energy management system (BEMS) technique, an ESS application technique, a solar power generation technique, a wind power generation technique, and a customer biomethane generation technique directly relate to direct current power, and the invention provides a means excellent in direct current distribution network catching of an LED lighting in terms of utilization of direct current power, and thus provides a basic means for commercialization and spread of the techniques.

As a separate lighting control solution, as for stage and broadcasting lighting in addition to indoor lighting, fusion/replacement landscape lighting and a stage or broadcasting lighting technique such as DMX 512, DMX standard of professional lighting and sound association (PLASA) of USA for separate entertainment environment is spread. Like DALI, when DMX is engrafted, economical efficiency and convenience are achieved.

The invention can be used as a direct current power and lighting actuator signal wiring technique in a transportation system such as a ship, a vehicle, and an aircraft, as an electrical system technique of a transportation means. In a case of a large ship, wiring in a ship through an alternating power line is spread. In recent, ship direct current wiring for utilizing an advantage of direct current wiring is being studied. Even in order to reduce the weight of a vehicle, when a technique of using a direct current power line communication technique together with the usage of control is applied, there is an advantage.

The invention can be utilized as an industrial actuator, an actuator for agriculture, fishery, and livestock industries, and an agricultural lighting control technique as a technique for facility management for agriculture, fishery, and livestock industries. An industrial machine, various motors, an actuator such as a valve, an agricultural motor, and a valve (injector for agricultural liquid raw material such as fertilizer or water) also simultaneously transmit a control signal together with power, and the technique can be spread.

As a technique for a road traffic signal system, it may be spread to a lighting of a road traffic signal system and a system control technique. In the existing crossroad traffic signal network, a control signal line of each traffic light is installed with power supply of the traffic light, and thus complicated wiring is necessary in a large console box. Although it is connected by star topology, ring topology, a power line, and a signal line can be processed by one electric wire when applying the technique of the present invention, and there is an advantage of reduction of construction costs and material costs, low breakdown frequency, and reduction of maintenance costs.

An easy means for the salient demand side load management of a smart grid, demand response, and a building energy management system (BEMS), which is the current topic of energy field, is provided, and can be utilized in a smart grid or demand management energy industry development. Various demand side load management systems will spread in the future, but there were no efficient means for load management of terminals. The present invention provides the means thereof to help the creation of global environment and social advantages and economical advantages according to energy saving.

What is claimed is:

1. An apparatus for transmitting not only direct current (DC) power, but also a control command or data through a power line, the apparatus comprising;
    two or more electric wires connecting a transmission side and a reception side;
    a DC power source connected to the transmission side;
    one or more DC power loads connected to the reception side;
    an H-bridge driving circuit disposed in the transmission side, the H-bridge driving circuit being connected to an output terminal of the DC power source;
    an interface (I/F) unit disposed in the transmission side and connected to an external signal source for accepting external control signal and connected to a first microcontroller or the H-Bridge driving circuit directly, the first microcontroller being disposed in the transmission side, the first microcontroller or the interface (I/F) unit controlling an output of the H-Bridge driving circuit, wherein the H-bridge driving circuit normally outputs a different level of flat voltage through each of the two or more electric wires, but outputs voltage polarity (+),(−) conversion patterns when transmitting a control command or data to the electric wires by the first microcontroller or the external signal source, the voltage polarity (+),(−) conversion patterns indicating which electric wire's voltage level is higher than the other as time passes and being mapped to the digital bit information '0' or '1' of the control command or the data to be transmitted, and the control command or data being restored by analyzing the voltage polarity(+), (−) conversion patterns of output power;
    a rectifier circuit, which is disposed in the reception side and which consists of bridge diode circuit or active bridge circuit, normally receiving the flat voltage and letting the flat voltage pass therethrough, but receiving the voltage level polarity (+), (−) conversion patterns and rectifying the voltage polarity (+), (−) conversion patterns into a flat DC power when transmitting the control command or data, the flat DC power from a signal output end of the rectifier circuit being used as a power source for the one or more DC power loads and for circuits of the reception side;
    a second microcontroller or a dedicated logic circuit disposed in the reception side;
    and a level shift unit disposed in the reception side, which is connected to a signal input end of the rectifier circuit, the level shift unit changing a level of voltage of one of the two or more electric wires to a level that can be used in the second microcontroller or the dedicated logic circuit, wherein the second microcontroller or the dedicated logic circuit analyzes the level-shifted voltage polarity (+), (−) conversion patterns, and decodes them to a transmitted control command or data for load control.

* * * * *